(12) United States Patent
Yang et al.

(10) Patent No.: US 11,740,587 B2
(45) Date of Patent: Aug. 29, 2023

(54) METHOD AND APPARATUS FOR GENERATING COMPUTER-GENERATED HOLOGRAM

(71) Applicant: SAMSUNG ELECTRONICS CO., LTD., Suwon-si (KR)

(72) Inventors: Daeho Yang, Suwon-si (KR); Myungjae Jeon, Yongin-si (KR); Jong-Young Hong, Suwon-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 17/318,784

(22) Filed: May 12, 2021

(65) Prior Publication Data

US 2022/0171334 A1    Jun. 2, 2022

(30) Foreign Application Priority Data

Dec. 1, 2020  (KR) .......................... 10-2020-0165947

(51) Int. Cl.
  *G03H 1/22*  (2006.01)
  *G03H 1/08*  (2006.01)
(52) U.S. Cl.
  CPC .......... *G03H 1/2294* (2013.01); *G03H 1/0841* (2013.01); *G03H 2225/34* (2013.01)
(58) Field of Classification Search
  CPC ............... G03H 1/2294; G03H 1/0841; G03H 2225/34; G03H 1/00; G03H 1/02; G03H 1/04; G03H 1/0443; G03H 2001/045; G03H 1/08; G03H 1/0808; G03H 2001/0816; G03H 2001/0825; G03H 1/0866; G03H 2001/0883; G03H 1/0891; G03H 1/16; G03H 1/22; G03H 2001/2223; G03H 2001/2228; G03H 2001/2231; G03H 2001/2234; G03H 1/2249; G03H 2001/2252; G03H 2210/40;
(Continued)

(56) References Cited

U.S. PATENT DOCUMENTS 6,621,605 B1 *  9/2003  Grossetie ................. G03H 1/26
                                                    359/9
2019/0294108 A1  9/2019  Ozcan et al.
(Continued)

FOREIGN PATENT DOCUMENTS

KR     10-2022-0023953 A     3/2022

OTHER PUBLICATIONS

Liu et al., "Calculating Real-time Computer-Generated Holograms for Holographic 3D Displays through Deep Learning", doi:10.1364/DH.2019.Tu4A.7, 2019, Total 2 pages.
(Continued)

*Primary Examiner* — Arnel C Lavarias
(74) *Attorney, Agent, or Firm* — Sughrue Mion, PLLC

(57) ABSTRACT

Provided is a method of generating a computer-generated hologram (CGH), the method including obtaining complex data including amplitude data of object data and phase data of the object data corresponding to a spatial light modulator (SLM) plane by propagating the object data from an image plane to the SLM plane, encoding the complex data into encoded amplitude data, and generating a CGH based on the object data including the encoded amplitude data.

19 Claims, 12 Drawing Sheets

(58) Field of Classification Search
CPC ......... G03H 2210/44; G03H 2210/441; G03H 2210/45; G03H 2210/454; G03H 2225/31
USPC .............................. 359/9, 1, 29, 32, 33, 35
See application file for complete search history.

(56) References Cited

U.S. PATENT DOCUMENTS

2020/0192287 A1* 6/2020 Chakravarthula ... G03H 1/0866
2022/0057750 A1 2/2022 Yang et al.

OTHER PUBLICATIONS

Rivenson et al., "Phase recovery and holographic image reconstruction using deep learning in neural networks", Light: Science & Applications, vol. 7, doi:10.1038/lsa.2017.141, Feb. 23, 2018, Total 9 pages.

Jiao et al., "Compression of Phase-Only Holograms with JPEG Standard and Deep Learning", Applied Sciences, vol. 8, doi:10.3390/app8081258, Jul. 30, 2018, Total 12 pages.

Horisaki et al., "Deep-learning-generated holography", Applied Optics, vol. 57, No. 14, pp. 3859-3863, May 10, 2018, Total 5 pages.

* cited by examiner

METHOD AND APPARATUS FOR GENERATING COMPUTER-GENERATED HOLOGRAM

CROSS-REFERENCE TO RELATED APPLICATION

This application claims priority to Korean Patent Application No. 10-2020-0165947, filed on Dec. 1, 2020 in the Korean Intellectual Property Office, the disclosure of which is incorporated by reference herein in its entirety.

BACKGROUND

1. Field

Example embodiments of the present disclosure relate to a method and apparatus for generating a computer-generated hologram (CGH).

2. Description of Related Art

Holography is a type of three-dimensional (3D) spatial representation technology that has no view limitation and induces almost no stereoscopic fatigue since objects are reproduced in a 3D space by adjusting an amplitude and phase of light. Therefore, many devices that implement a high-resolution hologram in real time using a spatial light modulator (SLM) capable of controlling the amplitude or phase of light have been developed. A hologram may be displayed in a 3D space by using an interference pattern between an object wave and a reference wave. Recently, a computer-generated holography that may provide a hologram on a flat panel display by processing an interference pattern for reproducing a hologram has been utilized. A method of generating a digital hologram, for example, a computer-generated holography, creates a hologram by approximating optical signals and calculating an interference pattern generated through mathematical operations. A method of generating a digital hologram represents a completed hologram by calculating object data constituting an object based on a structure of the object that includes a set of various data, such as 3D points, polygons, or depth data.

SUMMARY

One or more example embodiments provide methods and apparatuses for generating a computer-generated hologram (CGH).

One or more example embodiments also provide are computer-readable recording media in which a program for executing the methods on a computer is recorded. The technical problem to be achieved by example embodiments not limited to the technical problems as described above, and other technical problems may be inferred from the following embodiments.

Additional aspects will be set forth in part in the description which follows and, in part, will be apparent from the description, or may be learned by practice of example embodiments.

According to an aspect of an example embodiment, there is provided a method of generating a computer-generated hologram (CGH), the method including obtaining complex data including amplitude data of object data and phase data of the object data corresponding to a spatial light modulator (SLM) plane by propagating the object data from an image plane to the SLM plane, encoding the complex data into encoded amplitude data, and generating a CGH based on the object data including the encoded amplitude data.

The obtaining of the complex data may further include propagating the object data and obtaining the complex data based on a deep learning network.

The method may further include assigning phase data to the object data corresponding to the image plane based on a deep learning network.

The assigning of the phase data may further include, based on the generated CGH being output through the SLM, assigning phase data based on a frequency of light, a distance between an observer and the SLM plane, and a size of an eye lens of the observer such that all light emitted from the SLM passes through the eye lens of the observer.

The encoding may include encoding the complex data based on a deep learning network.

The encoding may further include inputting the complex data to the deep learning network, inputting reverse output data from the deep learning network to the deep learning network in a reverse direction, and obtaining a difference between the complex data and the reverse data output by the deep learning network with respect to the output data.

The encoding may further include controlling the deep learning network to perform an operation with respect to the complex data to minimize the difference.

The encoding may further include repeating the inputting the complex data to the deep learning network, the inputting reverse output data from the deep learning network, and the obtaining the difference until the difference is less than or equal to a preset size, wherein a finally generated output data corresponds to the encoded amplitude data.

The method may further include, based on a plurality of image planes being set, obtaining and encoding the complex data for each of the plurality of image planes, and the generating of the CGH may further include generating the CGH based on all of the object data including the encoded amplitude data corresponding to each of the plurality of image planes.

The SLM may include an amplitude SLM, and the method may further include outputting the generated CGH through the amplitude SLM.

According to an aspect of another example embodiment, there is provided a computer-generated hologram (CGH) generating apparatus including a memory configured to store at least one program, and a processor configured to generate a CGH by executing the at least one program, wherein the processor is further configured to obtain complex data including amplitude data of object and phase data of the object data corresponding to a spatial light modulator (SLM) plane by propagating object data from an image plane to the SLM plane, encode the complex data into encoded amplitude data, and generate the CGH based on the object data including the encoded amplitude data.

The processor may be further configured to propagate the object data and obtain the complex data based on a deep learning network.

The processor may be further configured to assign phase data to the object data corresponding to the image plane based on a deep learning network.

The processor may be further configured to, based on the generated CGH being output through the SLM, assign the phase data based on a frequency of light, a distance between an observer and the SLM plane, and a size of an eye lens of the observer such that all light emitted from the SLM passes through the eye lens of the observer.

The processor may be further configured to perform the encoding based on a deep learning network.

The processor may be further configured to input the complex data to the deep learning network, input reverse output data from the deep learning network to the deep learning network in a reverse direction, and obtain a difference between the reverse data output through the deep learning network and the complex data with respect to the output data.

The processor may be further configured to control the deep learning network to perform an operation with respect to the complex data to minimize the difference.

The processor may be further configured to repeat the inputting the complex data to the deep learning network, the inputting reverse output data from the deep learning network, and the obtaining the difference until the difference is less than or equal to a preset size, and a finally generated output data may correspond to the encoded amplitude data.

Based on a plurality of image planes being set, the processor may be further configured to perform a process of obtaining and encoding the complex data for each of the plurality of image planes, and generate the CGH based on all of the object data including the encoded amplitude data corresponding to each of the image planes.

The SLM may include an amplitude SLM, and the processor may be further configured to output the generated CGH through the amplitude SLM.

According to another aspect of another example embodiment, there is provided a computer-readable recording medium having recorded thereon a program for executing a method on a computer, the method including obtaining complex data including amplitude data of object data and phase data of the object data corresponding to a spatial light modulator (SLM) plane by propagating the object data from an image plane to the SLM plane, encoding the complex data into encoded amplitude data, and generating a CGH based on the object data including the encoded amplitude data.

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1:
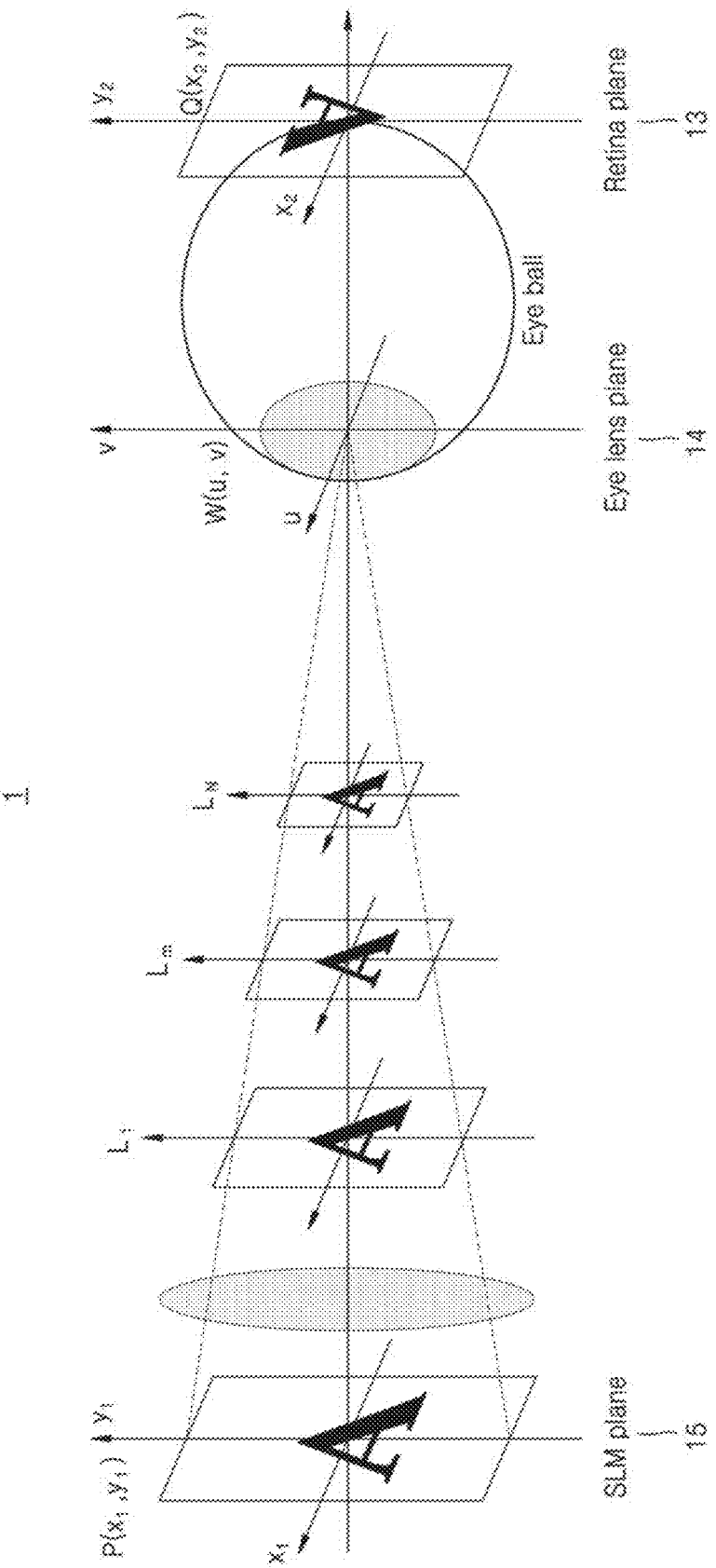
FIG. 1 is a diagram illustrating the principle of computer-generated holography according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Terminologies used herein are selected as commonly used by those of ordinary skill in the art in consideration of functions of the example embodiments, but may vary according to the technical intention, precedents, or a disclosure of a new technology. Also, in particular cases, some terms are arbitrarily selected by the applicant, and in this case, the meanings of the terms will be described in detail at corresponding parts of the specification. Accordingly, the terms used in the specification should be defined not by simply the names of the terms but based on the meaning and contents of the whole specification.

In the descriptions of example embodiments, it will be understood that, when an element is referred to as being connected to another element, it may include electrically connected when the element is directly connected to the other element and when the element is indirectly connected to the other element by intervening a constituent element. Also, it should be understood that, when a part "comprises" or "includes" a constituent element in the specification, unless otherwise defined, it is not excluding other elements but may further include other elements.

It will be further understood that the term "comprises" or "includes" should not be construed as necessarily including various constituent elements and various operations described in the specification, and also should not be construed that portions of the constituent elements or operations of the various constituent elements and various operations may not be included or additional constituent elements and operations may further be included.

It will be understood that, although the terms "first," "second," etc. may be used herein to describe various constituent elements, these constituent elements should not be limited by these terms. The terms are used only for the purpose of distinguishing one component from another component.

The descriptions of example embodiments should not be interpreted as limiting the scope of right, and embodiments that are readily inferred from the detailed descriptions and embodiments by those of ordinary skill in the art will be construed as being included in the present disclosure. Reference will now be made in detail to example embodiments of which are illustrated in the accompanying drawings.

FIG. 1 is a diagram illustrating the principle of computer-generated holography according to an example embodiment;

An observer may recognize an object existing in a space through an eyeball. An observer may see an object in a space when light reflected from the object is refracted through an eye lens in front of the eyeball and focused on a retina at the back of the eyeball. By using the principle described above, the principle of computer-generated holography may be implemented.

When a focus of an eye lens plane W(u,v) 14 of an observer is arranged to correspond to a specific depth layer $L_1$, $L_m$ or $L_N$, an image on the depth layer may have an imaging focus on a retina plane $Q(x_2, y_2)$ 13. Then, by reversely propagating the image formed on the retina plane 13 to a spatial light modulator (SLM) plane or a CGH plane $P(x_1, y_1)$ 15, a complex light wave field in the SLM plane 15 (or referred to as a "CGH plane") may be calculated, and thereby, a CGH interference pattern for expressing CGH may be obtained. The SLM plane includes a light source of the SLM and is a plane perpendicular to light emitted from the light source.

CGH may be classified into a point cloud method, a polygon method, a depth map (or layer-based) method, and the like. For example, in the point cloud method, since the surface of an object is expressed as a number of points and an interference pattern of each point is calculated, a more precise depth expression is possible, but the amount of calculation significantly increases depending on the number of points. In the polygon method, a surface of an object is represented by polygonal meshes and each interference pattern is calculated. Thus, the amount of calculation is reduced, however the precision of the object decreases. The depth map method is a layer-based method, and is a method of generating CGH by using a 2D intensity image and depth data. Thus, a calculation amount may be determined according to the resolution of the image.

The depth map method is a method of generating CGH after modeling by approximating an object to a multi-depth, and thus calculation efficiency may be higher than the other methods. In addition, it is possible to generate CGH with only 2D intensity information and depth information, such as a general picture.

When generating CGH according to the depth map method, most of the processing of computer-generated holography is occupied by a fast Fourier transform (FFT) operation. The fast Fourier transform (FFT) in the processing is an operation for obtaining a distribution of a diffracted image obtained by Fresnel diffraction of an image, and corresponds to a generalized Fresnel transform (GFT) or a Fresnel transform, which is apparent to those skilled in the art. In the example embodiments, Fourier transform may include FFT, GFT, and Fresnel transform, which are operations using Fourier transform.

Figure 2A:
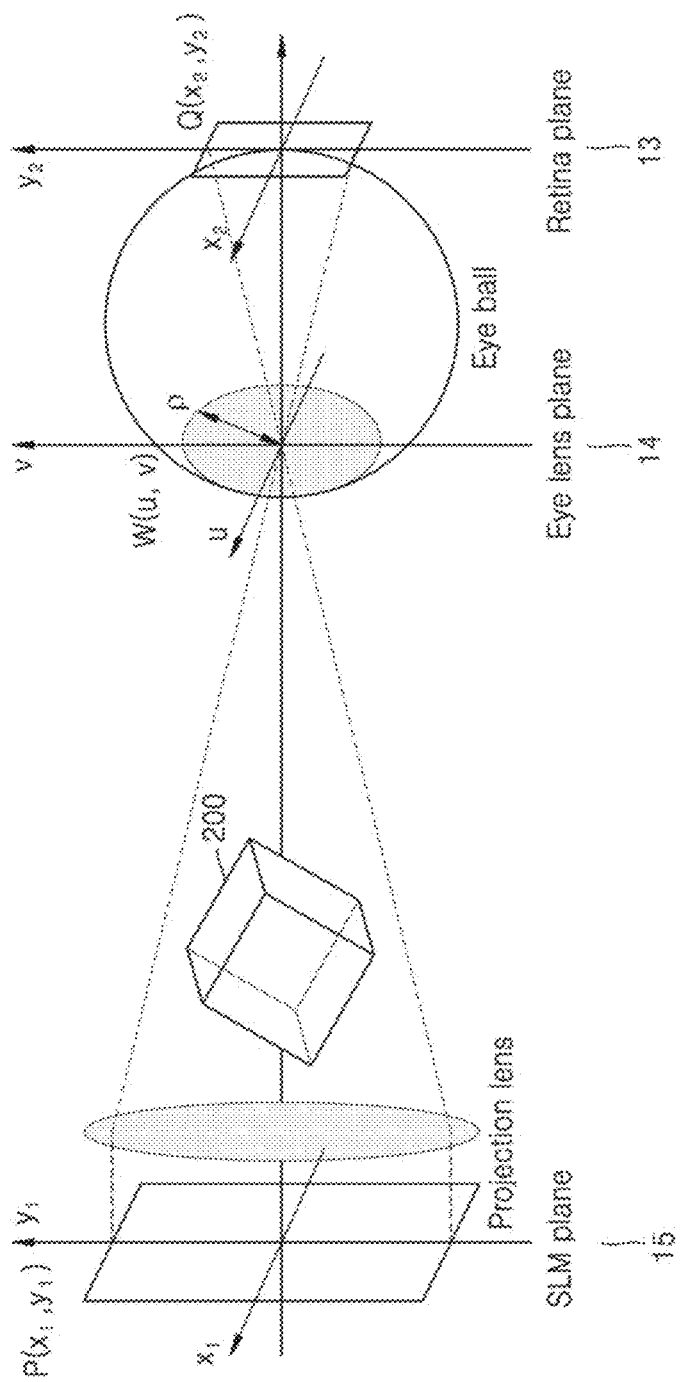
FIGS. 2A and 2B are diagrams illustrating two-dimensional (2D) images for each depth layer of an object when a computer-generated hologram (CGH) of an object is generated via a depth map method according to an example embodiment.
Figure 2B:
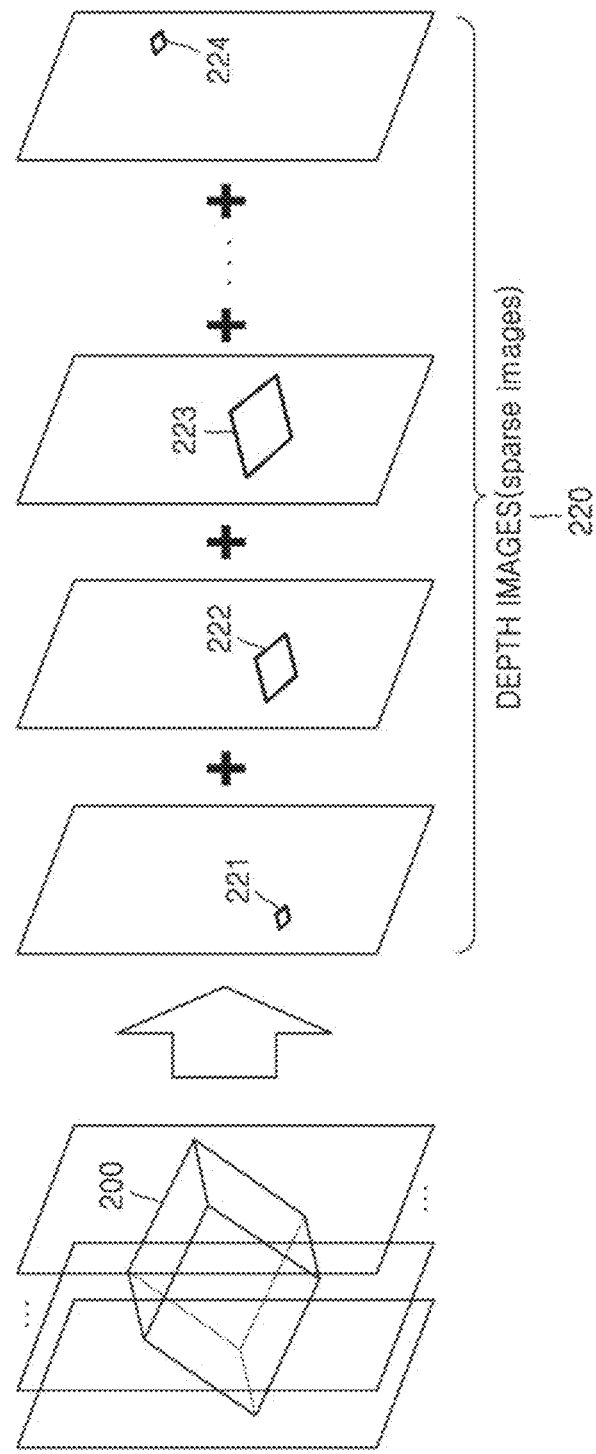

FIGS. 2A and 2B are diagrams for explaining 2D images for each depth layer of an object when a computer-generated hologram (CGH) of an object is generated in a depth map method according to an example embodiment;

Referring to FIG. 2A, the object 200 is located on a space between the eye lens plane W(u,v) 14 and a SLM plane (or a CGH plane) $P(x_1, y_1)$ 15. However, this is only an example, and the position of the object 200 may be located behind the SLM plane 15 with respect to the eye lens plane 14, or behind the eye lens plane 14 with respect to the SLM plane 15.

According to the depth map method, the space may be set to be divided into a predetermined number of depth layers. Here, the number of depth layers is an arbitrary number that may be changed by a user. For example, the number of depth layers may be 256 or a different number.

Referring to FIG. 2B, the object 200 may be modeled as depth images 220 corresponding to a preset number of depth layers. Each of the depth images includes object data 221 to 224 of the object 200 at a corresponding depth. In an example embodiment, the object data 221 to 224 include information on an amplitude and phase of light for indicating the object 200 at the corresponding depth.

Figure 3:
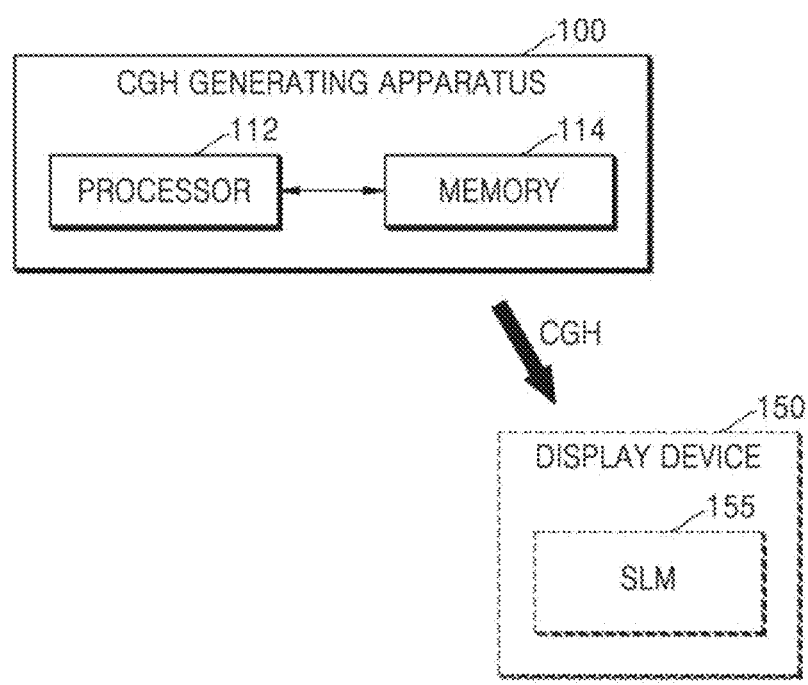
FIG. 3 is a block diagram of a hardware configuration of a CGH generating apparatus according to an example embodiment.

FIG. 3 is a block diagram of a hardware configuration of a CGH generating apparatus 100 according to an example embodiment.

Referring to FIG. 3, the CGH generating apparatus 100 may include a processor 112 and a memory 114. In the CGH generating apparatus 100 shown in FIG. 3, only components related to the example embodiments are shown. Accordingly, it is obvious to those skilled in the art that the CGH generating apparatus 100 may further include other general-purpose components in addition to the components shown in FIG. 3.

The processor 112 may correspond to a processor included in various types of computing devices, such as personal computers (PCs), server devices, televisions (TVs), mobile devices (smartphones, tablet devices, etc.), embedded devices, autonomous vehicles, wearable devices, augmented reality (AR) devices, IoTs (Internet of Things). For example, the processor 112 may correspond to a processor, such as a central processing unit (CPU), a graphics processing unit (GPU), an application processor (AP), and a neural processing unit (NPU), but is not limited thereto.

The processor 112 may be implemented as an array of a plurality of logic gates, or may be implemented as a combination of a general-purpose microprocessor and a memory in which a program executable in the microprocessor is stored. In addition, it may be understood by those of ordinary skill in the art that embodiments may be implemented with other types of hardware.

The processor 112 may perform overall functions for controlling the CGH generating device 100 provided with the processor 112. The processor 112 may generally control the CGH generating apparatus 100 by executing programs stored in the memory 114. For example, when the CGH generating device 100 is provided in a display device 150, the processor 112 may control the display of a holographic image by the display device 150 by controlling image processing by the CGH generating device 100.

The display device 150 may correspond to a device capable of displaying a holographic image on a 3D space based on the CGH generated by the CGH generating device 100. The display device 150 may include a hardware module for reproducing a hologram, such as a spatial light modulator (SLM) 155. The SLM 155 may correspond to an amplitude SLM that controls the amplitude of light or a phase SLM that controls the phase of light. In addition, the display device 150 may include various types of display panels, such as liquid crystal on silicon (LCoS), liquid crystal display (LCD), and organic light-emitting device (OLED). For example, the display device 150 may include various hardware modules and hardware components for displaying a holographic image in addition to the CGH generating apparatus 100 for generating CGH.

The CGH generating apparatus 100 may be a separate and independent device implemented outside of the display device 150. In this case, the display device 150 may receive CGH data generated by the external CGH generating apparatus 100 and display a holographic image based on the received CGH data. For example, the implementation method of the CGH generating apparatus 100 and the display device 150 is not limited by any one embodiment.

The memory 114 is a hardware device that stores various types of data processed in the processor 112, for example, the memory 114 may store CGH data processed by the processor 112 and CGH data to be processed. In addition, the memory 114 may store various applications to be driven by the processor 112, for example, a hologram playback application, a web browsing application, a game application, a video application, and the like.

The memory 114 may include at least one of a volatile memory and a nonvolatile memory. The nonvolatile memory includes read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (Fe-RAM), etc. The volatile memory includes, for example, dynamic RAM (DRAM), static RAM (SRAM), synchronous DRAM (SDRAM), phase-change RAM (PRAM), magnetic RAM (MRAM), resistive RAM (RRAM), and etc. In an example embodiment, the memory 114 may be implemented as at least one of, for example, a hard disk drive (HDD), a solid state drive (SSD), a compact flash (CF), a secure digital (SD), a micro secure digital (Micro-SD), a mini-SD (mini-SD), secure digital), xD (extreme digital), or a memory stick.

The processor 112 may propagate object data from the image plane to the SLM plane. The image plane is a plane including object data, and exists at a position where CGH is to be output (reproduced or displayed) on a space through the SLM 155 and is parallel to the SLM plane. One or more image planes may exist depending on the setting of the CGH generating apparatus. Since the image plane may correspond to the depth layer described with reference to FIGS. 2A and 2B, descriptions thereof will be omitted.

The processor 112 may obtain complex data including amplitude data and phase data of the object data in the SLM plane with respect to the object data propagated to the SLM plane. Since the object data propagated from the image plane to the SLM plane may include data on a component perpendicular to the image plane, the processor 112 may perform a process of propagating the object data to the SLM plane.

The processor 112 may encode the complex data into encoded amplitude data. The processor 112 may perform encoding with respect to the object image in a format suitable for input to the SLM 155. For example, in order to output CGH through the amplitude SLM, the processor 112 may encode the complex data into amplitude data encoded to have only an amplitude component. As a method for the processor 112 to encode complex data, a Fourier transform may be used, a complex conjugate for object data, or Burch encoding may be used. However, embodiments are not limited thereto, and any method capable of encoding a complex value as an amplitude value may be used without limitation.

The processor 112 may generate CGH by using object data having encoded amplitude data. When a plurality of image planes are set, the processor 112 may perform a process of obtaining and encoding complex data for each image plane. That is, the processor 112 may obtain complex data by propagating object data of each image plane to the SLM plane, and encode the complex data of each object data. The processor 112 may generate CGH by merging all of the respective object data having the encoded amplitude data.

The larger the number of image planes, the more clearly the three-dimensionality of the object may be output (reproduced or displayed) in CGH. However, since as the number of image planes increases, the amount of computation increases, the number of image planes may be set appropriately in consideration of the performance of the processor 112, the performance of the deep learning network, the size and complexity of the object, the distance between the image plane and the SLM plane, and the time allowed for CGH generation, etc.

The SLM 155 included in the display device 150 may correspond to an amplitude SLM. The processor 112 may output (reproduce or display) CGH through the amplitude SLM by inputting CGH including the encoded amplitude data to the amplitude SLM.

Figure 4:
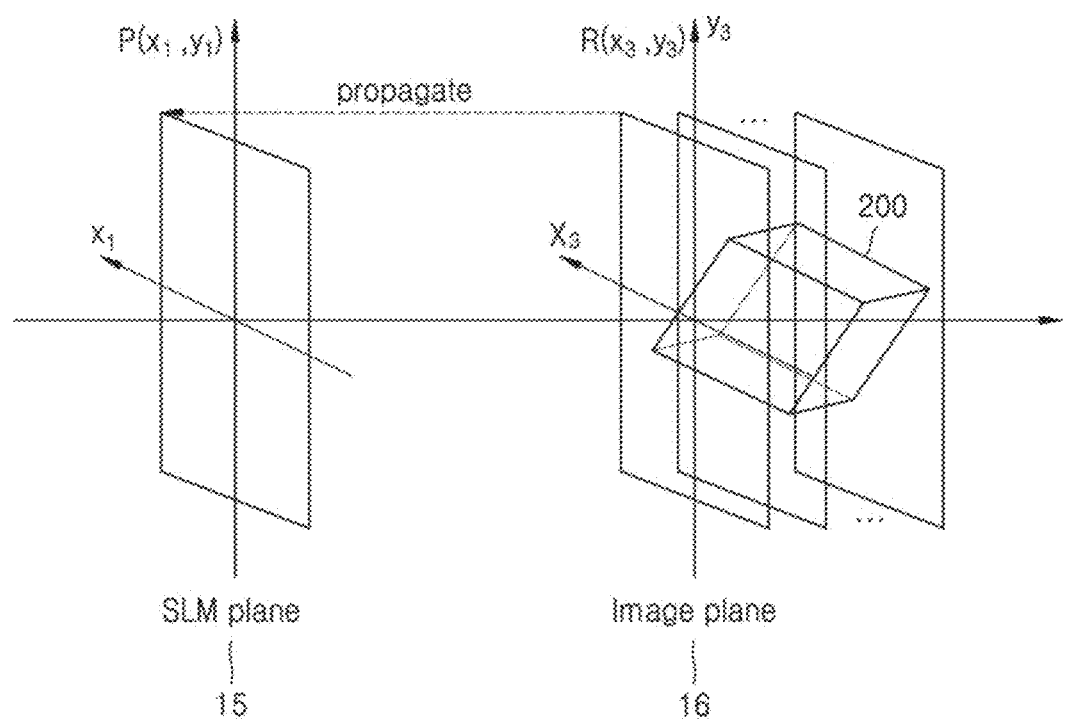
FIG. 4 is a diagram illustrating propagation of object data according to an example embodiment.

FIG. 4 is a diagram for describing propagation of object data according to an example embodiment.

Referring to FIG. 4, the SLM plane 15, an image plane $R(x_3, y_3)$ 16, and the object 200 are shown, and the image plane 16 may be formed to cross a part of the object 200.

One or more image planes 16 may exist according to settings. The image plane 16 includes object data of the object 200, and the object data may be expressed in the form of an outline of an area where the object 200 and the image plane 16 contact each other. For example, the image plane 16 may be expressed in the same form as the depth images 220 of FIG. 2B.

The processor 112 may obtain complex data of the object data in the SLM plane 15 by propagating the object data from the image plane 16 to the SLM plane 15. Since the image plane 16 includes only $x_3$ and $y_3$ components, in order to also obtain data on a $z_3$ component perpendicular to the image plane 16, the processor 112 may propagate the object data in a direction from the image plane 16, which is a direction corresponding to the $z_3$ component, to the SLM plane 15.

As shown in FIG. 4, when a plurality of image planes 16 are set, the processor 112 may propagate all object data of each image plane 16 to the SLM plane 15. The processor 112 may obtain each complex data of the propagated object data.

Figure 5:
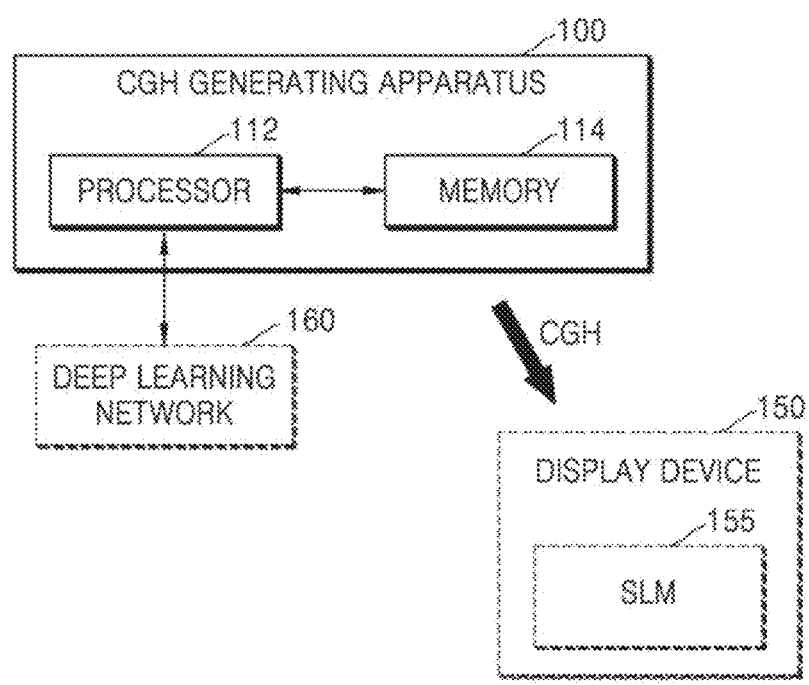
FIG. 5 is a block diagram of a hardware configuration of a CGH generating apparatus according to another example embodiment.

FIG. 5 is a block diagram of a hardware configuration of a CGH generating apparatus 100 according to another example embodiment.

Referring to FIG. 5, the CGH generating apparatus 100 includes a processor 112 and a memory 114, and the processor 112 may control the deep learning network 160. In the CGH generating apparatus 100 shown in FIG. 5, only components related to the example embodiments are shown. Therefore, it is obvious to those skilled in the art that the CGH generating apparatus 100 may further include other general-purpose components in addition to the components shown in FIG. 5.

The processor 112, the memory 114, the display device 150, and the SLM 155 of FIG. 5 may correspond to the processor 112, the memory 114, the display device 150, and the SLM 155 of FIG. 3, respectively, and thus, the descriptions thereof will be omitted.

The deep learning network 160 may be an architecture of a deep neural network (DNN) or n-layers neural networks. The DNN or n-layer neural network may correspond to convolutional neural networks (CNN), recurrent neural networks (RNN), deep belief networks, restricted Boltzman machines, etc.

The deep learning network 160 may be included in a separate independent device implemented outside the CGH generating apparatus 100. In this case, the deep learning network 160 may receive data by the external CGH generating apparatus 100 and may output a result of performing the deep learning operation. However, embodiments are not limited thereto. For example, the deep learning network 160 may be included in the CGH generating apparatus 100. That is, the implementation method of the CGH generating apparatus and the deep learning network 160 is not limited by any one embodiment.

The processor 112 may perform a process of propagating object data to the SLM plane 155 and obtaining complex data by using the deep learning network 160. The processor 112 may also perform a process of encoding complex data by using the deep learning network 160. For example, the processor 112 may perform only one of the two processes using the deep learning network 160 or may perform both processes using the deep learning network 160.

The CGH generating device 100 may perform calculations more effectively and generate CGH with clearer image quality by utilizing the deep learning network 160 in generating CGH. In a method of generating CGH, a process that occupies most of the computational amount is the process of propagating object data to an SLM plane and obtaining complex data. Accordingly, the CGH generating apparatus 100 may perform the corresponding process at a relatively high speed by using the deep learning network 160.

A method of using the deep learning network 160 in a process in which the CGH generating apparatus 100 encodes complex data will be described later with reference to FIGS. 7A, 7B, and 8.

Figure 6:
FIG. 6 is a diagram illustrating a CGH image according to an example embodiment.

FIG. 6 is a diagram illustrating a CGH image 610 according to an example embodiment.

Referring to FIG. 6, the CGH image 610 in which the generated CGH is arranged by distance based on the lens plane of the observer's lens is shown. The farther away from a lens plane of a lens, the CGH is arranged from the upper left to the upper right and from the lower left to the lower right.

The CGH image 610 shown in FIG. 6 is an image of CGH generated as a result of performing a process of propagating object data to the SLM plane and obtaining complex data using a deep learning network.

Since the eighth image from the image on the upper left of FIG. 6, which is the fourth image from the left on the bottom row in FIG. 6, is the clearest, it may be seen that the focus of the lens plane of the lens corresponds to the position of the eighth image. When an image is farther away from the eighth image, the image is farther away from the focal point of the lens plane of the lens, and thus, the sharpness of the image deteriorates.

Figure 7A:
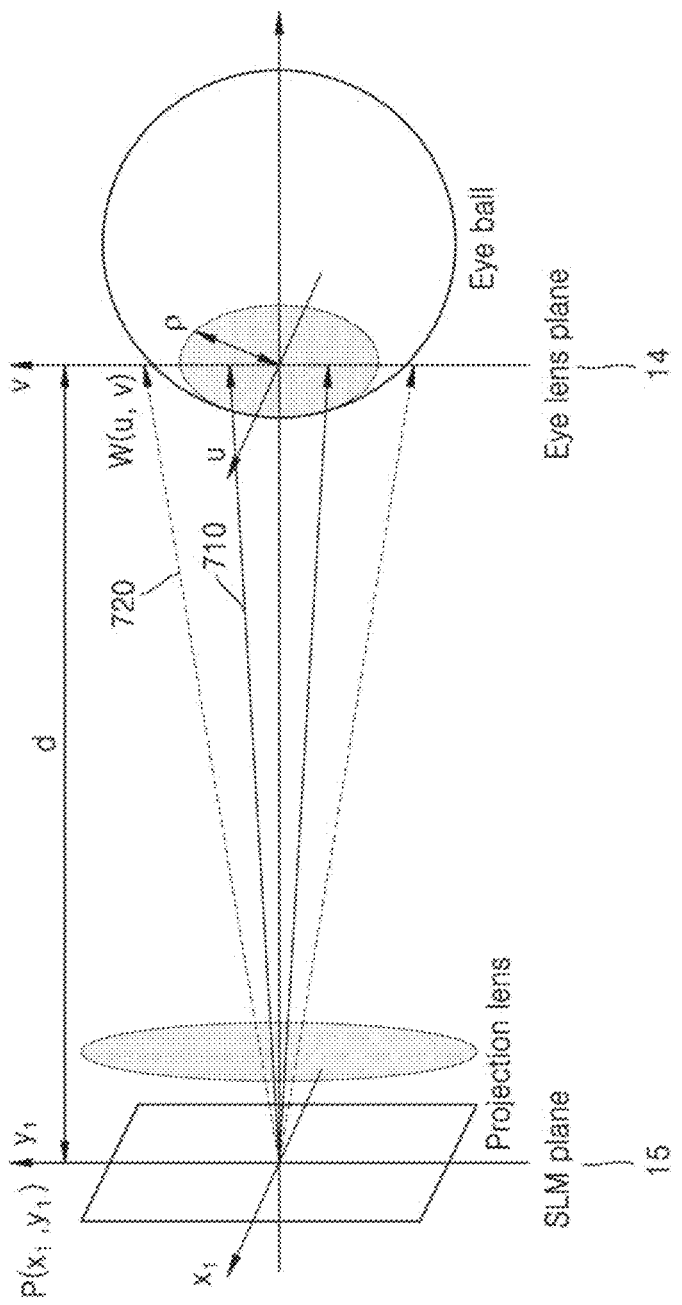
FIGS. 7A and 7B are diagrams illustrating light emitted from a spatial light modulator (SLM) by frequency.
Figure 7B:
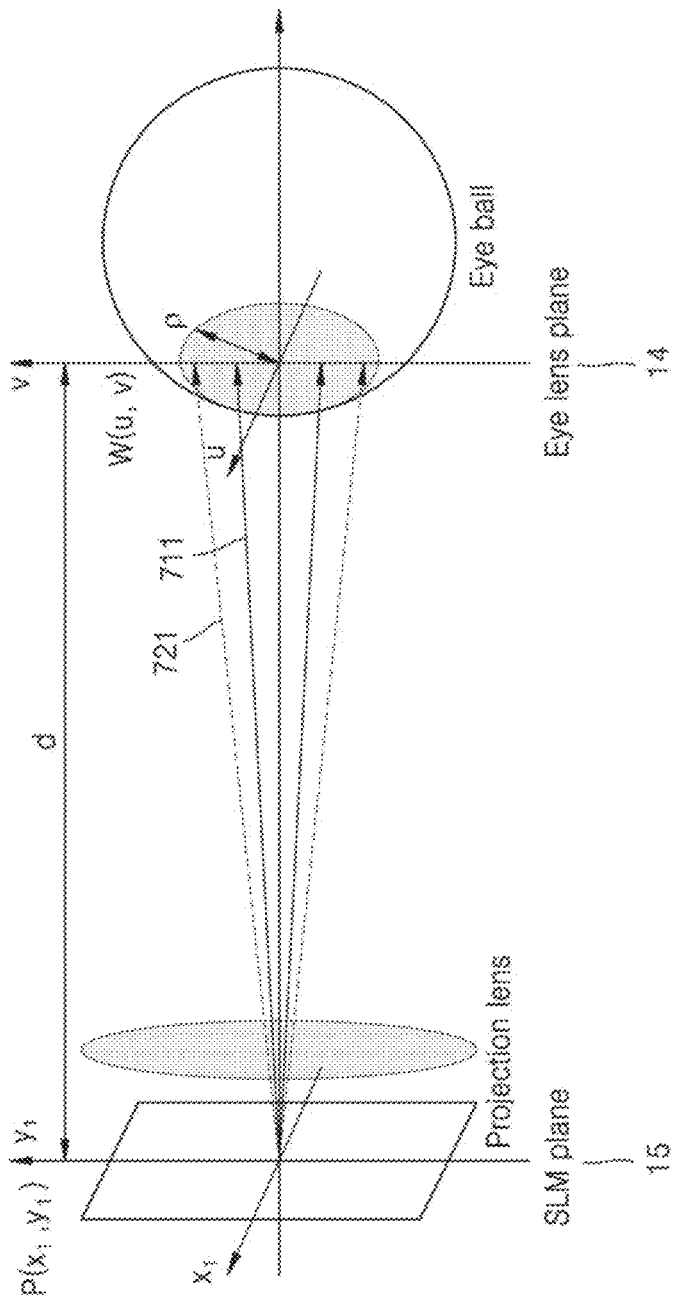

FIGS. 7A and 7B are diagrams illustrating light emitted from a spatial light modulator (SLM) by frequency.

Referring to FIG. 7A, high frequency light 720 emitted from the SLM reaches the outside of an eye lens, and low frequency light 710 emitted from the SLM reaches the eye lens.

When CGH is output through the SLM, light corresponding to the CGH may be emitted from the SLM. Light of various frequencies may be emitted from the SLM, and the higher the frequency of light, the more detailed the CGH is. Accordingly, a clear image may be provided to an observer only when all light including high-frequency light emitted from the SLM reaches the eye lens.

However, since the frequency and the refractive index of light are proportional, the higher the frequency of light, the more refraction occurs, and when the light reaches the eye lens plane 14, the light may reach a point farther away from the center of the eye lens. As shown in FIG. 7A, the high-frequency light 720 may reach a point on the eye lens plane 14 at a distance greater than a radius p of the eye lens from the center of the eye lens, and the low-frequency light 710 may reach the eye lens. In this case, since an image corresponding to the high-frequency light 720 may not be provided to the observer, the observed CGH will have relatively low clarity. Therefore, the CGH generating apparatus may control a phase of the object data so that the high-frequency light 720 also reaches the eye lens.

Referring to FIG. 7B, all lights 711 and 721 emitted from the SLM, including the light 721 corresponding to the high-frequency light 720 of FIG. 7A, reach the lens of the eye lens. As shown in FIG. 7B, when the generated CGH is output through the SLM, the CGH generating apparatus may control object data in an image plane so that all light emitted from the SLM reaches the eye lens.

The object data at the image plane includes amplitude data related to brightness or shape of an image, but may not include phase data. Accordingly, in order to obtain complex data with respect to the object data, the processor may assign phase data to the object data in the image plane. In this case, the processor may assign the phase data to the object data by using a deep learning network.

A frequency of light emitted from the SLM may be determined according to the phase data assigned to the object data in the image plane. Specifically, when object data to which the phase data is assigned is propagated to the SLM plane 15 and encoding with respect to the propagated object data is performed, CGH may be generated. When the generated CGH is output through the SLM, the frequency of light emitted from the SLM may be determined according to phase data assigned to object data in the image plane. Accordingly, the processor may determine phase data to be assigned to the object data in the image plane so that the frequency of light with respect to the generated CGH is relatively low, and thus, all of light passes through the eye lens.

The processor may assign phase data based on a frequency of light, a distance d between the observer and the SLM plane 15, and a size of the eye lens. A size of the eye lens may correspond to a radius p of the eye lens. For example, the processor may randomly assign phase data to object data in an image plane to generate CGH, and then, may re-apply a controlled phase data to the object data in the image plane so that all frequencies of light with respect to the generated CGH are controlled to be less than a predetermined value.

As the distance d between the lens plane 14 and the SLM plane 15 increases, the probability that refracted light reaches the outside of the eye lens increases. Accordingly, as the distance d increases, the frequency of light must decrease so that the light may reach an eye lens, and thus, the processor may assign phase data to the object data in the image plane based on the distance d. Also, the larger the radius p of the eye lens, the wider the frequency range of light that may be received. Accordingly, as the radius p of the eye lens decreases, the frequency of light must decrease so that light reaches the eye lens, and thus, the processor may assign phase data to object data in the image plane based on the size of the eye lens. A size of the eye lens may be set to a size of an average eye lens or may be a size measured for any observer's eye lens.

The CGH generating apparatus 100 may perform a process of assigning phase data to object data in an image plane through a deep learning network. The deep learning network may determine phase data to be assigned to object data in an image plane through a deep learning operation so that all light emitted from the SLM may pass through a viewer's eye lens. Therefore, the CGH generating apparatus 100 may more efficiently and accurately assign phase data to object data by using a deep learning network.

Figure 8:
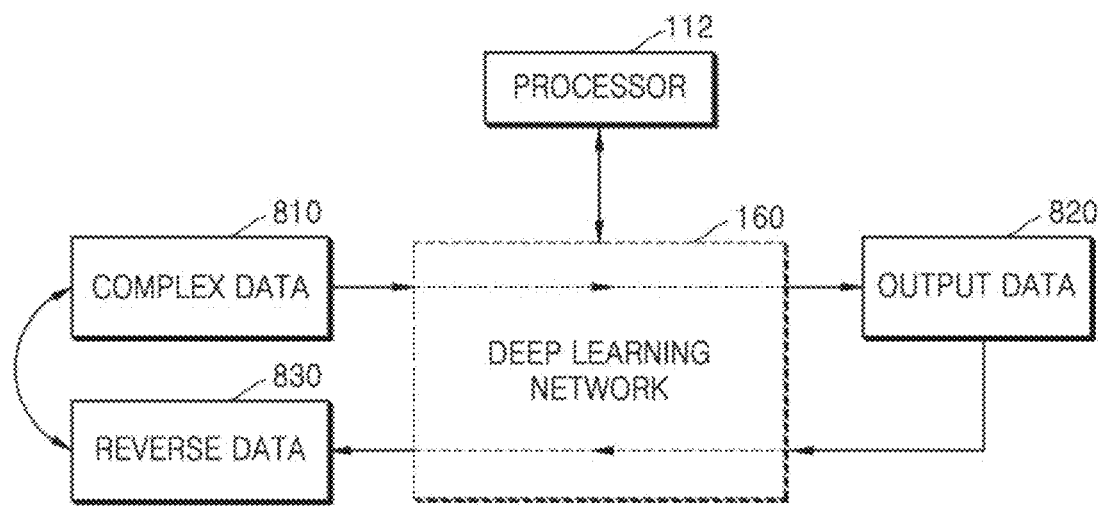
FIG. 8 is a block diagram for explaining a method of performing encoding by using a deep learning network according to an example embodiment.

FIG. 8 is a block diagram for explaining a method of performing encoding by using a deep learning network according to an example embodiment.

The CGH generating device may utilize the deep learning network 160 to encode complex data 810 so that CGH with clearer image quality may be generated. As a method of performing encoding by using deep learning, a method of comparing output data on which a deep learning operation with respect to original data (input data) has been performed with target data (or label data) is common. Unlike this method, the CGH generating apparatus 100, without using target data, may perform a method of comparing reverse data 830 with the original data 810, wherein the reverse data 830 is generated by re-inputting an output data 820 to the deep learning network 160 in a reverse direction.

The processor 112 may input the complex data 810 to the deep learning network 160. The deep learning network 160 may output the output data 820 by performing an encoding operation with respect to the complex data 810.

The processor 112 may input the output data 820 to the deep learning network 160 in a reverse direction. In the deep learning network 160, an operation may be performed with respect to the output data 820 in a direction opposite to the direction in which the complex data 810 is calculated. For example, if the complex data 810 is calculated through the order of the first layer, the second layer, and the third layer in the deep learning network 160, the output data 820 may be calculated through the order of the third layer, the second layer, and the first layer. The deep learning network 160 may output the reverse data 830 by performing an operation with respect to the output data 820 in the reverse direction.

As the reverse data 830 is similar to the complex data 810, the output data 820 may be data in which the complex data 810 is accurately encoded. The processor 112 may compare the reverse data 830 and the complex data 810. For example, the processor 112 may calculate a difference between amplitude data and phase data respectively included in the complex data 810 and the reverse data 830. The processor 112 may calculate a loss generated in a process of calculating the deep learning network 160 based on the calculated difference. The greater the absolute value of the calculated difference, the greater the loss generated in the encoding operation performed in the deep learning network 160.

If the output data 820 does not specifically implement a fringe pattern corresponding to the object data, a large amount of loss may be calculated. The fringe pattern has a high frequency component and may include a detailed portion of an image or an outer portion of the image in the output data 820. If the fringe pattern is not specifically implemented, CGH with low sharpness may be provided to the observer.

Accordingly, in order to minimize the loss, the processor 112 may control the deep learning network 160 so that the difference between the reverse data 830 and the complex data 810 is minimized. When the deep learning network 160 performs an operation with respect to the complex data 810, the processor 112 may control the deep learning network 160 to minimize a difference between the reverse data 830 and the complex data 810.

The processor 112 may repeat the process of inputting the complex data 810 to the deep learning network 160 to the process of calculating a difference between the reverse data 830 and the complex data 810 until a difference between the reverse data 830 and the complex data 810 is less than a preset size. For example, the difference between the reverse data 830 and the complex data 810 compared with the preset size may be an absolute value of a difference between amplitude data and phase data included in each of the complex data 810 and the reverse data 830.

The processor 112 may stop the process of inputting the complex data 810 to the deep learning network 160 when the difference between the reverse data 830 and the complex data 810 is calculated to be less than a preset size. The output data 820 corresponding to reverse data 830 and complex data 810 having a difference less than or equal to a preset size may correspond to encoded amplitude data used to generate CGH. That is, the output data 820 generated in the last process of the above described repeating process may correspond to the encoded amplitude data used to generate CGH.

However, in the method of comparing output data and target data by using deep learning, which is a related method described above, even if there is a large difference in a fringe pattern of the output data and the target data, the difference is recognized as a minor difference and the overall difference is determined to be not large. Accordingly, in the related method described above, since it is difficult to specifically implement the fringe pattern, although the output data may express an outline part of an image, there may be a limitation in expressing a detailed part.

Meanwhile, the reverse data 830 generated from the output data 820 in which the fringe pattern is not specifically implemented may have a relatively large difference from the complex data 810. Therefore, the CGH generation apparatus according to example embodiments may employ a method of generating the reverse data 830 to output the output data 820 that specifically implements the fringe pattern, and the detailed part of the image may be more clearly expressed compared to the above-described related method.

Also, as the difference between the reverse data 830 and the complex data 810 is reduced, noise included in the corresponding output data 820 may be reduced. Noise degrades the clarity of CGH and outputs unnecessary images, which may occur during an encoding process. For example, the noise may include constant data for converting a component having a negative intensity into a positive intensity in the complex data 810, and complex conjugate data used to convert the complex data 810 into amplitude data.

Figure 9:
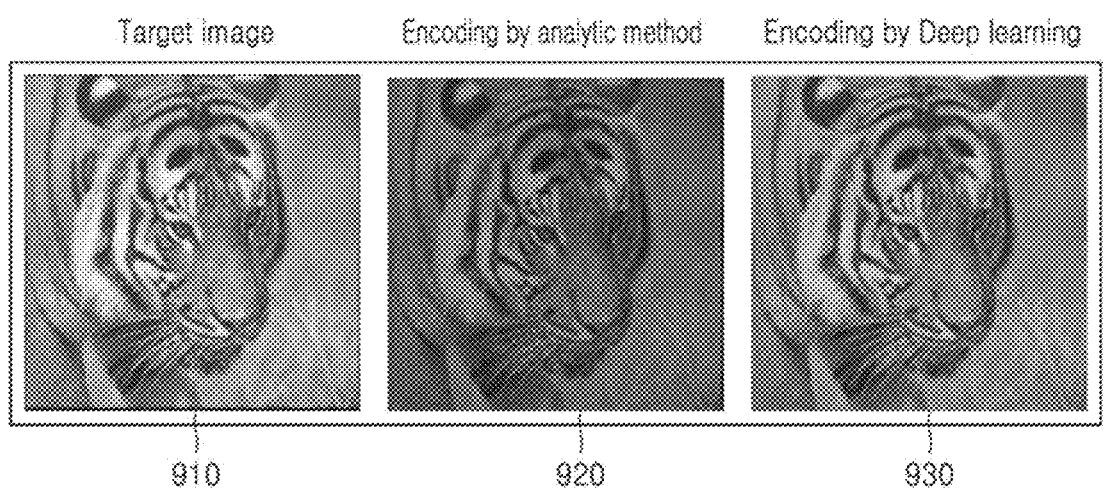
FIG. 9 is a diagram showing a CGH image according to another example embodiment.

FIG. 9 is a diagram showing a CGH image according to another example embodiment.

Referring to FIG. 9, a target image 910, an image 920 for CGH generated by performing encoding by using an analytic method of the related embodiment, and an image 930 for CGH generated in a CGH generating apparatus according to example embodiments by using a deep learning network are shown.

The CGH image 930 generated in the CGH generating apparatus shown in FIG. 9 is an image with respect to CGH generated as a result of performing a process of encoding complex data by using a deep learning network. It may be seen that the image 930 with respect to CGH generated by the CGH generating apparatus according to example embodiments by using the deep learning network is more similar to the target image 910 than the image 920 generated by a method of a related embodiment. For example, it may be seen that a beard shown in the CGH image 930 generated by the CGH generating apparatus is expressed more clearly and in greater detail.

In this way, the CGH generating apparatus according to example embodiments may perform encoding more accurately and generate clearer CGH by performing encoding using a deep learning network.

Figure 10:
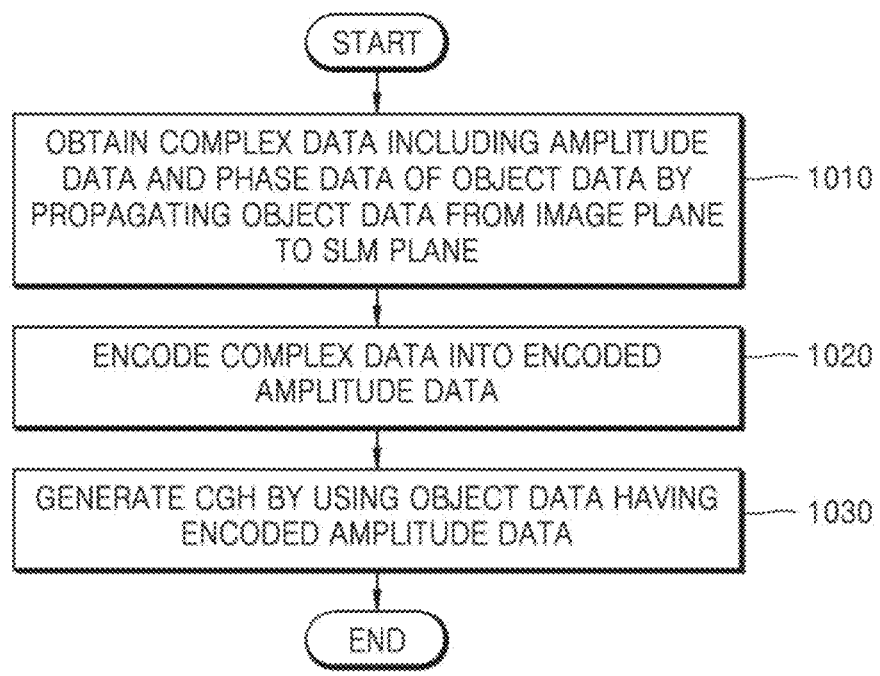
FIG. 10 is a flowchart of an operating method of a CGH generating apparatus according to an example embodiment.

FIG. 10 is a flowchart of a method of operating a CGH generating apparatus according to an example embodiment.

Referring to FIG. 10, the method of operating the CGH generating apparatus according to an example embodiment includes operations processed in a time series in the CGH generating apparatus shown in FIGS. 3 and 5. Accordingly, the above descriptions with respect to the CGH generating apparatus with reference to FIGS. 3 and 5 may also be applied to the method of FIG. 10 even if not described below. Therefore, redundant descriptions will be omitted.

In operation 1010, the CGH generating apparatus may obtain complex data including amplitude data and phase data of object data by propagating the object data from an image plane to an SLM plane.

The CGH generating apparatus may propagate the object data and obtain the complex data by using a deep learning network.

Prior to operation 1010, the CGH generating apparatus may assign phase data to object data in the image plane by using a deep learning network. The CGH generating apparatus may assign phase data based on a frequency of light, a distance between an observer and the SLM plane, and a size of an eye lens so that all light emitted from the SLM passes through the observer's eye lens when the generated CGH is output through the SLM.

In operation 1020, the CGH generating apparatus may encode the complex data into encoded amplitude data.

The CGH generating apparatus may perform encoding by using a deep learning network. The CGH generating apparatus may input the complex data to the deep learning network, and input output data from the deep learning network to the deep learning network in a reverse direction. The CGH generating apparatus may calculate a difference between the reverse data and the complex data output through the deep learning network with respect to the output data.

The CGH generating apparatus may control the deep learning network to perform an operation on complex data with the aim of minimizing the calculated difference. The CGH generating apparatus may repeat from the operation of inputting complex data to the deep learning network to the operation of calculating the difference until the difference is less than or equal to a preset size.

The finally generated output data may correspond to the encoded amplitude data.

In operation 1030, the CGH generating apparatus may generate CGH by using the object data having the encoded amplitude data.

When a plurality of image planes are set, the CGH generating apparatus may perform an operation of obtaining and encoding complex data for each image plane.

The CGH generating apparatus may generate CGH by using all object data having encoded amplitude data corresponding to each image plane.

The SLM used in the method of generating CGH of FIG. 10 may correspond to an amplitude SLM, and the CGH generating apparatus may output the generated CGH through the amplitude SLM.

The operation method of FIG. 10 described above may be recorded in a computer-readable recording medium in which one or more programs including instructions for executing the method are recorded. Examples of non-transitory computer-readable recording media include magnetic media, such as hard disks, floppy disks, and magnetic tape, optical media, such as CD-ROMs and DVDs, magneto-optical media, such as floptical disks, and hardware devices specifically configured to store and execute program instructions, such as ROM, RAM, flash memory, etc. Examples of program instructions include machine code produced by a compiler as well as high-level language code that may be executed by a computer by using an interpreter etc.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims and their equivalents.

What is claimed is:

1. A method of generating a computer-generated hologram (CGH), the method comprising:
obtaining complex data including amplitude data of object data and phase data of the object data corresponding to a spatial light modulator (SLM) plane by propagating the object data from an image plane to the SLM plane;
encoding the complex data into encoded amplitude data; and
generating a CGH based on the object data including the encoded amplitude data,
wherein the obtaining of the complex data further comprises propagating the object data and obtaining the complex data based on a neural network.

2. The method of claim 1, wherein the method further comprises, based on a plurality of image planes being set, obtaining and encoding the complex data for each of the plurality of image planes, and
wherein the generating of the CGH further comprises generating the CGH based on all of the object data including the encoded amplitude data corresponding to each of the plurality of image planes.

3. The method of claim 1, wherein the SLM comprises an amplitude SLM, and
wherein the method further comprises outputting the generated CGH through the amplitude SLM.

4. A method of generating a computer-generated hologram (CGH), the method comprising:
obtaining complex data including amplitude data of object data and phase data of the object data corresponding to a spatial light modulator (SLM) plane by propagating the object data from an image plane to the SLM plane;
encoding the complex data into encoded amplitude data;
generating a CGH based on the object data including the encoded amplitude data, and
assigning phase data to the object data corresponding to the image plane based on a neural network.

5. The method of claim 4, wherein the assigning of the phase data further comprises, based on the generated CGH being output through the SLM, assigning phase data based on a frequency of light, a distance between an observer and the SLM plane, and a size of an eye lens of the observer such that all light emitted from the SLM passes through the eye lens of the observer.

6. A method of generating a computer-generated hologram (CGH), the method comprising:
obtaining complex data including amplitude data of object data and phase data of the object data corresponding to a spatial light modulator (SLM) plane by propagating the object data from an image plane to the SLM plane;

encoding the complex data into encoded amplitude data based on a neural network; and generating a CGH based on the object data including the encoded amplitude data.

7. The method of claim 6, wherein the encoding further comprises:

inputting the complex data to the neural network;

inputting reverse output data from the neural network to the neural network in a reverse direction; and obtaining a difference between the complex data and the reverse data output by the neural network with respect to the output data.

8. The method of claim 7, wherein the encoding further comprises controlling the neural network to perform an operation with respect to the complex data to minimize the difference.

9. The method of claim 8, wherein the encoding further comprises:

repeating the inputting the complex data to the neural network, the inputting reverse output data from the neural network, and the obtaining the difference until the difference is less than or equal to a preset size, wherein a finally generated output data corresponds to the encoded amplitude data.

10. A computer-generated hologram (CGH) generating apparatus comprising:

a non-transitory memory configured to store at least one program; and a processor configured to generate a CGH by executing the at least one program, wherein the processor is further configured to:

obtain complex data including amplitude data of object and phase data of the object data corresponding to a spatial light modulator (SLM) plane by propagating object data from an image plane to the SLM plane, encode the complex data into encoded amplitude data, and generate the CGH based on the object data including the encoded amplitude data, and wherein the processor is further configured to propagate the object data and obtain the complex data based on a neural network.

11. The CGH generating apparatus of claim 10, wherein the processor is further configured to, based on the generated CGH being output through the SLM, assign the phase data based on a frequency of light, a distance between an observer and the SLM plane, and a size of an eye lens of the observer such that all light emitted from the SLM passes through the eye lens of the observer.

12. The CGH generating apparatus of claim 10, wherein, based on a plurality of image planes being set, the processor is further configured to:

perform a process of obtaining and encoding the complex data for each of the plurality of image planes; and generate the CGH based on all of the object data including the encoded amplitude data corresponding to each of the image planes.

13. The CGH generating apparatus of claim 10, wherein the SLM comprises an amplitude SLM, and wherein the processor is further configured to output the generated CGH through the amplitude SLM.

14. A computer-generated hologram (CGH) generating apparatus comprising:

a non-transitory memory configured to store at least one program; and a processor configured to generate a CGH by executing the at least one program, wherein the processor is further configured to:

obtain complex data including amplitude data of object and phase data of the object data corresponding to a spatial light modulator (SLM) plane by propagating object data from an image plane to the SLM plane, encode the complex data into encoded amplitude data, generate the CGH based on the object data including the encoded amplitude data, and assign phase data to the object data corresponding to the image plane based on a deep neural network.

15. A computer-generated hologram (CGH) generating apparatus comprising:

a non-transitory memory configured to store at least one program; and a processor configured to generate a CGH by executing the at least one program, wherein the processor is further configured to:

obtain complex data including amplitude data of object and phase data of the object data corresponding to a spatial light modulator (SLM) plane by propagating object data from an image plane to the SLM plane, encode the complex data into encoded amplitude data based on a neural network, and generate the CGH based on the object data including the encoded amplitude.

16. The CGH generating apparatus of claim 15, wherein the processor is further configured to:

input the complex data to the neural network;

input reverse output data from the neural network to the neural network in a reverse direction; and obtain a difference between the reverse data output through the neural network and the complex data with respect to the output data.

17. The CGH generating apparatus of claim 16, wherein the processor is further configured to control the neural network to perform an operation with respect to the complex data to minimize the difference.

18. The CGH generating apparatus of claim 17, wherein the processor is further configured to repeat the inputting the complex data to the neural network, the inputting reverse output data from the neural network, and the obtaining the difference until the difference is less than or equal to a preset size, and wherein a finally generated output data corresponds to the encoded amplitude data.

19. A non-transitory computer-readable recording medium having recorded thereon a program for executing a method on a computer, the method comprising:

obtaining complex data including amplitude data of object data and phase data of the object data corresponding to a spatial light modulator (SLM) plane by propagating the object data from an image plane to the SLM plane;

encoding the complex data into encoded amplitude data; and generating a CGH based on the object data including the encoded amplitude data, wherein the obtaining of the complex data further comprises propagating the object data and obtaining the complex data based on a neural network.

* * * * *